US010786769B2

(12) United States Patent
Jiang et al.

(10) Patent No.: US 10,786,769 B2
(45) Date of Patent: Sep. 29, 2020

(54) FLOW RESTRICTION VALVE AND FILTER CARTRIDGE

(75) Inventors: Zemin Jiang, Cookeville, TN (US); Wassem Abdalla, Cookeville, TN (US); Jeffrey B. Sharp, Cookeville, TN (US); Hendrik Amirkhanian, Cookeville, TN (US); Jeff Husband, Cookeville, TN (US); Abby True-Dahl, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 1880 days.

(21) Appl. No.: 12/959,716

(22) Filed: Dec. 3, 2010

(65) Prior Publication Data
US 2011/0073538 A1 Mar. 31, 2011

Related U.S. Application Data

(63) Continuation of application No. 11/937,700, filed on Nov. 9, 2007, now Pat. No. 7,867,387, which is a
(Continued)

(51) Int. Cl.
*B01D 35/14* (2006.01)
*B01D 35/157* (2006.01)
(Continued)

(52) U.S. Cl.
CPC .......... *B01D 35/157* (2013.01); *B01D 29/21* (2013.01); *B01D 29/58* (2013.01);
(Continued)

(58) Field of Classification Search
CPC .................. B01D 35/157; B01D 35/1576; B01D 36/003; B01D 2201/295; B01D 2201/316;
(Continued)

(56) References Cited

U.S. PATENT DOCUMENTS 2,955,712 A * 10/1960 Gutkowski .......... B01D 35/147
210/234
3,363,762 A 1/1968 Ensign
(Continued)

FOREIGN PATENT DOCUMENTS

CN 2848327 12/2006
CN 1925900 3/2007

OTHER PUBLICATIONS

Office Action dated Sep. 9, 2014, Election/Restrictions section, 3 pages.*
(Continued)

*Primary Examiner* — Bobby Ramdhanie
*Assistant Examiner* — Denise R. Anderson
(74) *Attorney, Agent, or Firm* — Foley & Lardner LLP

(57) ABSTRACT

A "no filter, no run" filtration system that is designed to verify that a filter cartridge is present to safe-guard against damage to fuel injectors, associated fuel components, etc. and engine malfunctions. Fuel flow to the engine is prevented altogether or permitted in an amount insufficient to allow engine operation if a filter cartridge is not installed, and an appropriately designed filter cartridge is required to be used in order to permit sufficient fuel flow for engine operation. In one embodiment, a flow restriction valve is provided that includes a ball.

13 Claims, 16 Drawing Sheets

Related U.S. Application Data continuation-in-part of application No. 11/780,176, filed on Jul. 19, 2007, now abandoned.

(51) Int. Cl.
*B01D 29/21* (2006.01)
*B01D 36/00* (2006.01)
*B01D 29/58* (2006.01)

(52) U.S. Cl.
CPC ....... *B01D 35/1576* (2013.01); *B01D 36/003* (2013.01); *B01D 2201/295* (2013.01); *B01D 2201/316* (2013.01); *B01D 2201/4046* (2013.01)

(58) Field of Classification Search
CPC ............ B01D 2201/4046; B01D 29/96; B01D 35/153; B01D 2201/291; B01D 29/21; B01D 29/58; Y10S 137/901
See application file for complete search history.

(56) References Cited

U.S. PATENT DOCUMENTS

| | | | |
|---|---|---|---|
| 4,303,514 A | 12/1981 | Theorell | |
| 4,364,825 A * | 12/1982 | Connor, Jr. .......... | B01D 27/106 210/109 |
| 4,687,023 A | 8/1987 | Harbison et al. | |
| 5,049,269 A | 9/1991 | Shah | |
| 5,215,655 A * | 6/1993 | Mittermaier ................ | 210/234 |
| 5,362,390 A | 11/1994 | Widenhoefer et al. | |
| 5,458,767 A | 10/1995 | Stone | |
| 5,709,242 A * | 1/1998 | Bergen .................... | 137/533.11 |
| 5,714,030 A * | 2/1998 | Kitamura .............. | B01D 29/111 156/330 |
| 5,846,417 A | 12/1998 | Jiang et al. | |
| 5,855,780 A | 1/1999 | Dye et al. | |
| 5,906,737 A * | 5/1999 | Hoeppner ............. | B01D 29/111 210/232 |
| 6,053,334 A * | 4/2000 | Popoff ................... | B01D 27/07 210/234 |
| 6,113,781 A | 9/2000 | Popoff et al. | |
| 6,495,042 B1 | 12/2002 | Knight | |
| 6,554,139 B1 | 4/2003 | Maxwell et al. | |
| 6,884,349 B1 * | 4/2005 | Jiang ...................... | B01D 29/21 210/136 |
| 6,902,669 B2 | 6/2005 | Jiang | |
| 6,939,464 B1 | 9/2005 | Jiang et al. | |
| 7,749,383 B2 * | 7/2010 | Jiang ...................... | B01D 29/21 210/232 |
| 7,857,974 B2 * | 12/2010 | Jiang ...................... | B01D 29/21 210/232 |
| RE42,059 E | 1/2011 | Jiang | |
| 7,867,387 B2 * | 1/2011 | Jiang ...................... | B01D 29/21 210/119 |
| 7,935,255 B2 * | 5/2011 | Jiang ...................... | B01D 29/21 210/256 |
| 7,955,500 B2 * | 6/2011 | Abdalla ............... | B01D 35/153 137/533.11 |
| 8,852,443 B2 * | 10/2014 | Forrest ................. | B01D 35/153 210/101 |
| 9,011,683 B2 * | 4/2015 | South ................... | B01D 29/114 210/232 |
| 2005/0067342 A1 | 3/2005 | Bassett et al. | |
| 2006/0201557 A1 * | 9/2006 | Shieh ..................... | F16K 15/04 137/533.11 |
| 2007/0186525 A1 * | 8/2007 | Pearson ............. | B01D 46/0031 55/486 |
| 2009/0065447 A1 | 3/2009 | Forrest et al. | |
| 2009/0134087 A1 | 5/2009 | Hawkins et al. | |

OTHER PUBLICATIONS

U.S. Appl. No. 12/959,716, Portion of Office Action dated Sep. 9, 2014, 4 pages.*
U.S. Appl. No. 12/959,716, Portion of Office Action dated Mar. 27, 2015, 3 pages.*
International Search Report for international application No. PCT/US2008/067643, dated Jan. 5, 2009 (3 pages).
Written Opinion of the International Searching Authority for international application No. PCT/US2008/067643, dated Jan. 5, 2009 (5 pages).
Non-Final Office Action for U.S. Appl. No. 15/862,217 dated Jul. 16, 2020, 40 pages.

* cited by examiner

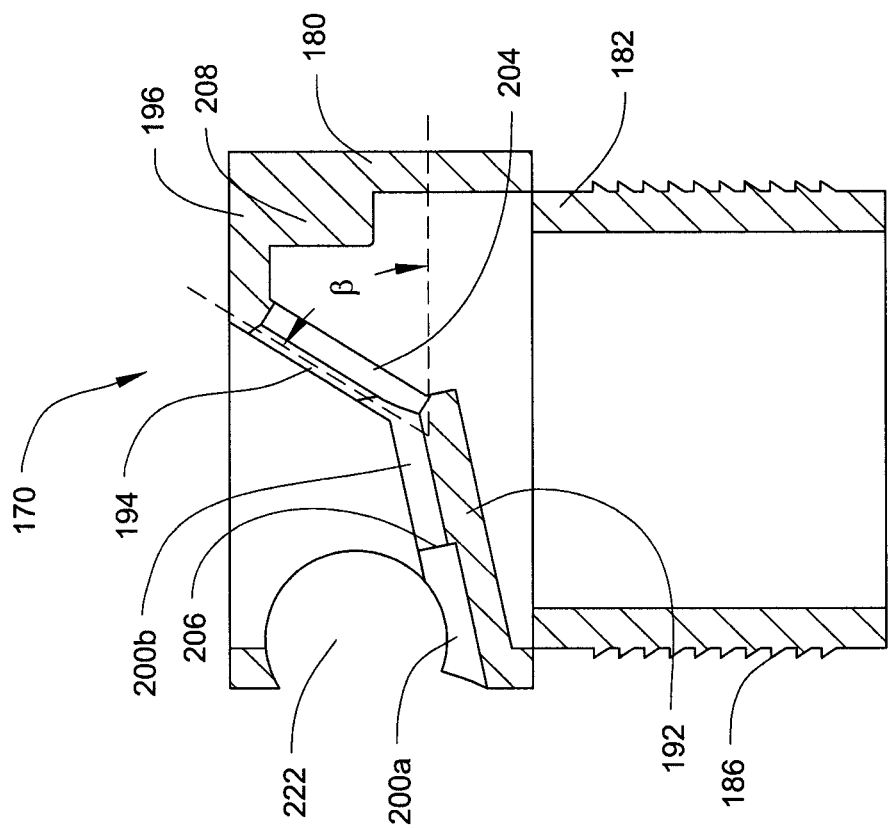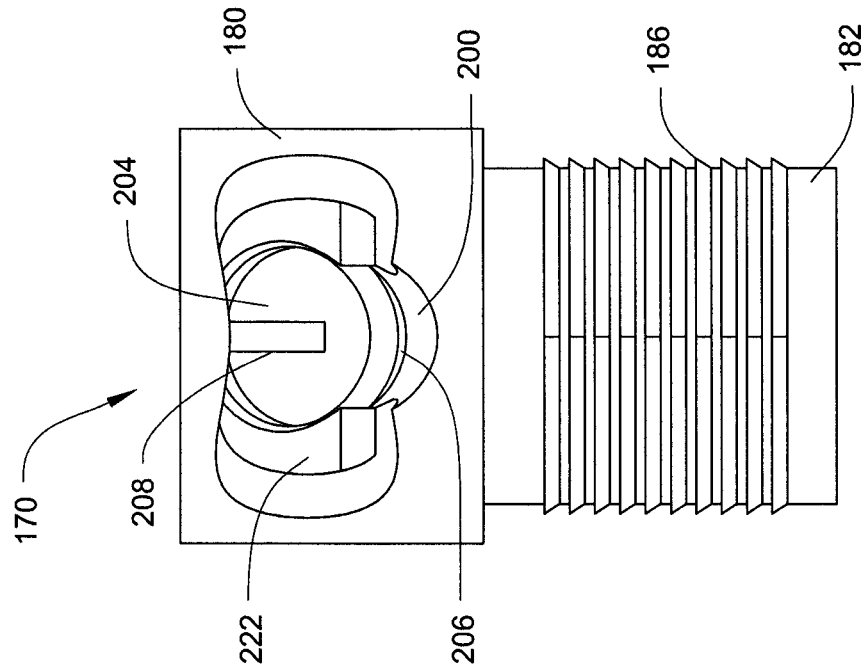

FLOW RESTRICTION VALVE AND FILTER CARTRIDGE

CROSS-REFERENCE TO RELATED APPLICATIONS

This application is a continuation application of U.S. Ser. No. 11/937,700 filed on Nov. 9, 2007, pending, which is a continuation-in-part application of U.S. Ser. No. 11/780,176 filed on Jul. 19, 2007, the contents of which are incorporated by reference herein in their entirety.

FIELD

This disclosure generally pertains to the field of filtration, and more particularly to fuel filtration systems designed to safe-guard against damage to fuel injectors, associated fuel components, and engine malfunctions resulting from a missing or incorrect fuel filter.

BACKGROUND

Fuel filtration systems are known that are designed to prevent flow of fuel to an engine if no filter cartridge is installed or in the incorrect filter cartridge is installed. In these "no filter, no run" systems, not only must a filter be present, but the correct filter must be used, in order to allow fuel to flow to the engine.

SUMMARY

A "no filter, no run" filtration system that is designed to verify that a filter cartridge is present to safe-guard against damage to fuel injectors, associated fuel components, etc. and engine malfunctions. Fuel flow to the engine is prevented altogether or permitted in an amount insufficient to allow engine operation if a filter cartridge is not installed, and an appropriately designed filter cartridge is required to be used in order to permit sufficient fuel flow for engine operation.

In one embodiment, a filter assembly includes a flow restriction valve controlling fluid flow to an outlet. The flow restriction valve includes a ball disposed on a sloped track, and the track includes a step that separates the sloped track into sloped track sections. The flow restriction valve is used in a filter housing, for example a fuel filter housing, that has a standpipe that incorporates the flow restriction valve to control fluid flow into a flow passage of the standpipe.

When a filter cartridge is not installed, or when an incorrect filter cartridge is installed, the ball is movable to a blocking position preventing flow into the standpipe. When the correct filter cartridge is installed, the ball is prevented from moving to the blocking position by a suitable blocking means. Suitable blocking means include a pin connected to a suitable part of the filter cartridge, for example an end plate or a center tube, a pin connected to a lid of the filter housing that is designed to extend downwardly through an end plate of the filter cartridge into a position to block the ball, or a pin that is installed separately from the filter cartridge. It is to be noted that the filter cartridge can be a filter-in-filter design, a single filter design, or any other type of filter design.

In another embodiment, a filter housing includes a housing body having a side wall and an end wall defining a filter cartridge space. The end wall forms a closed end of the filter cartridge space, and the body has an open end opposite the end wall. A standpipe extends from the end wall along a longitudinal axis into the filter cartridge space toward the open end. The standpipe is generally oval shaped in lateral cross-section, and includes an internal flow passage and an opening in the standpipe that places the internal flow passage in communication with the filter cartridge space. A generally oval, conically shaped structure is disposed at an upper end of the standpipe. The structure aids in automatically aligning a filter cartridge during installation.

In another embodiment, a filter cartridge includes a filter media suitable for filtering a fluid. The filter media has a first end, a second end opposite the first end, and a clean fluid side. A first end plate is connected to first end of the filter media, and a blocking pin is connected to the first end plate by ribs and extends into the clean fluid side. A skirt surrounds the blocking pin and the ribs. A second end plate is connected to the second end of the filter media. The second end plate includes a hole that allows passage of a fluid passageway member therethrough.

BRIEF DESCRIPTION OF THE DRAWINGS

FIGS. 9A and 9B are an end view and a side cross-sectional view, respectively, of the valve cage of the flow restriction valve.

DETAILED DESCRIPTION

Figure 1:
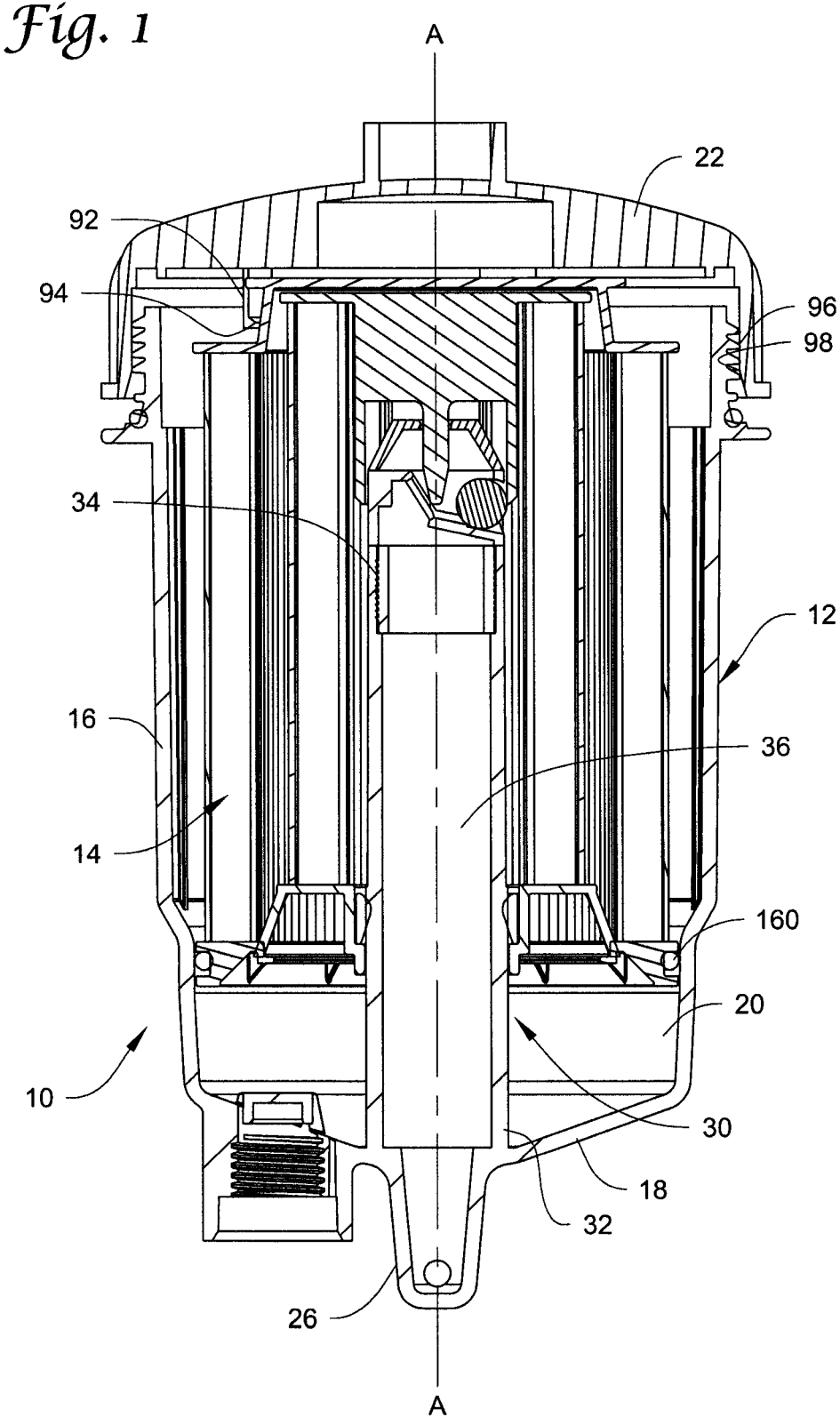
FIG. 1 is a sectional view of a filter assembly that includes a filter cartridge in a filter housing.

FIG. 1 illustrates a filter assembly 10, for example a fuel filter assembly, which is intended to filter a fluid, for example diesel fuel, and remove water from the fluid before the fluid reaches a protected system, for example a fuel injection pump and fuel injectors. This description will hereinafter describe the fluid as fuel. However, it is to be realized that the concepts described herein can be used for other fluids. In addition, in appropriate circumstances, the concepts described herein can be used to remove contaminants other than water from the fluid. And, in appropriate circumstances, one or more of the concepts described herein can be applied to other types of filter assemblies that filter other types of fluids, for example lubrication, hydraulic and other liquids, as well as air.

The assembly 10 includes a filter housing 12 that is designed to receive a filter cartridge 14 therein for filtering the fluid. The filter housing 12 includes a housing body that has a side wall 16 and an end wall 18. The side wall 16 and the end wall 18 define a filter cartridge space 20 that is large enough to receive the filter cartridge 14 therein, with the end wall 18 forming a closed end of the space 20. The housing body has an open end generally opposite the end wall 18, with the open end in use being closed by a lid 22 that closes off the space 20. The housing body also includes an inlet opening 24, illustrated in FIG. 2, through which fuel to be filtered enters the space 20, and an outlet 26, illustrated as extending from the end wall 18, through which fuel exits on its way to the engine. It is to be realized that the filter housing 12 could have other configurations than that described herein.

A fluid passageway member in the form of a standpipe 30 is secured to the end wall 18 and extends upwardly into the space 20 toward the open end and the cap 22. In the illustrated embodiment, the standpipe 30 is generally hollow from its end 32 connected to the end wall 18 to a tip end 34 thereof thereby defining an internal flow passage 36. The flow passage 36 is in communication with the outlet 26 so that fuel that enters the standpipe 30 can flow from the standpipe and into the outlet 26 to the engine. The standpipe 30 is disposed in the housing 12 which has a central axis A-A. In some embodiments, the axis A-A of the housing 12 can be off-center of the housing.

Figure 2:
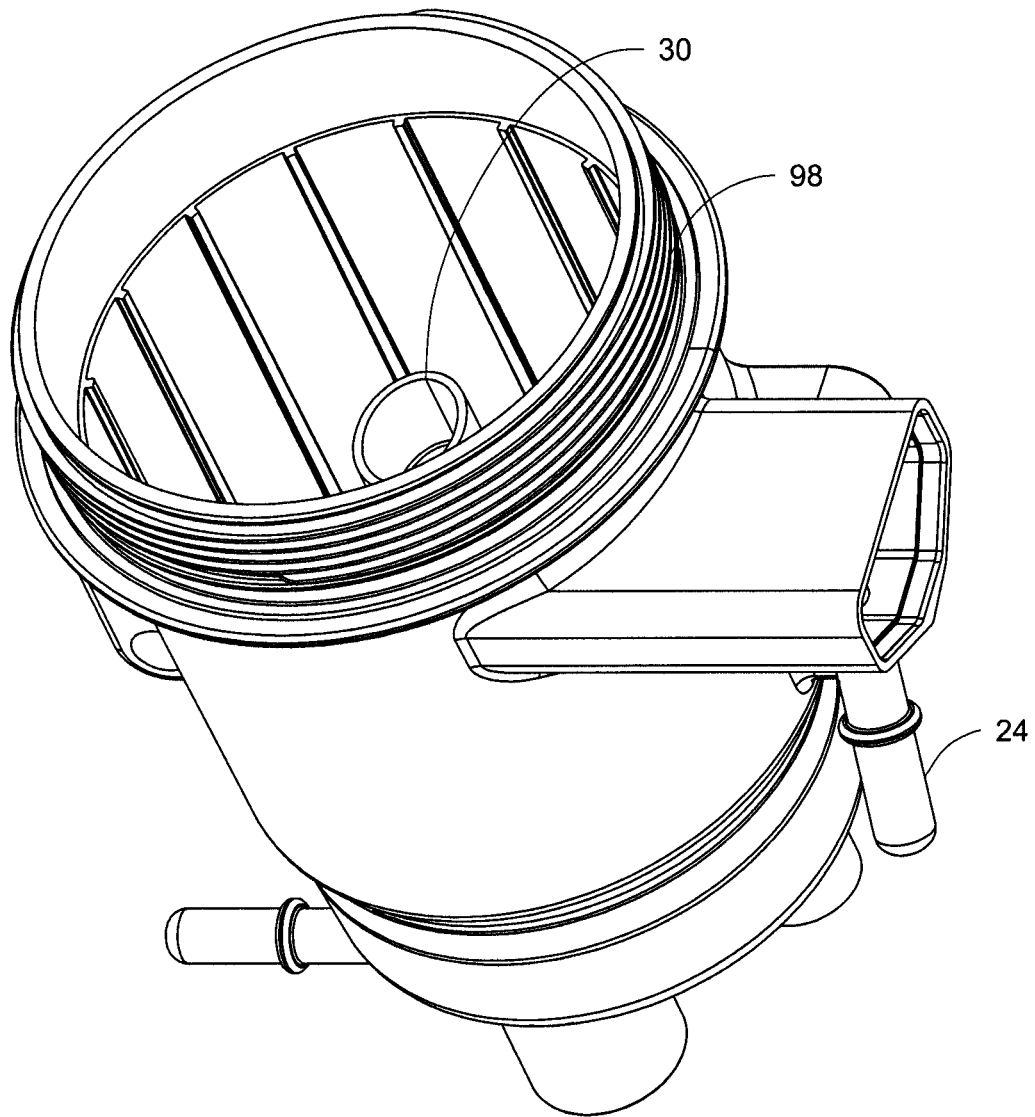
FIG. 2 is a perspective view of the filter housing with the lid removed to show the interior of the housing.

With reference to FIG. 2, the standpipe 30 is illustrated as being oval-shaped from the end 32 to the tip end 34. An example of an oval standpipe is disclosed in U.S. Pat. No. 6,884,349, which is incorporated by reference herein in its entirety. While this disclosure will describe the standpipe as being oval-shaped, it is to be realized that the concepts described herein could be used, individually or in various combinations, with a circular-shaped standpipe and with standpipes having other shapes.

A flow restriction valve 50 is disposed at the tip end of the standpipe 30 to control the flow of fuel into the standpipe. The valve 50 can prevent fuel flow into the standpipe when the filter cartridge 14 is not installed or when an incorrect filter cartridge is installed. In some embodiments described herein, when the filter cartridge 14 or other appropriately designed filter cartridge is installed, the filter cartridge is designed to interact with the valve in such a manner as to keep the valve from preventing fuel flow into the standpipe. An example of a valve operating in this manner is disclosed in U.S. Pat. No. 6,884,349.

Filter Cartridge

Figure 3:
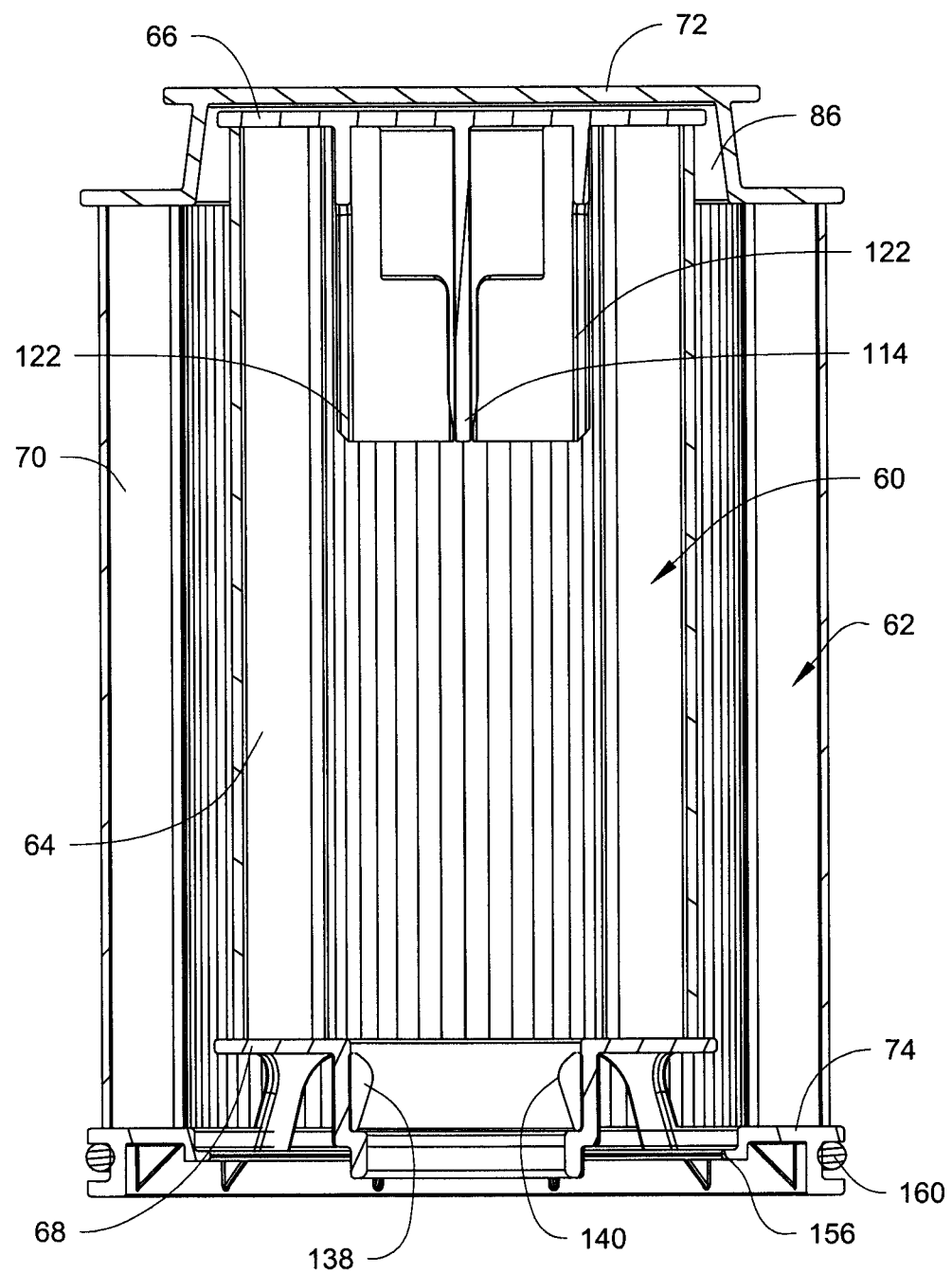
FIG. 3 is a detailed cross-sectional view of the filter cartridge.

With reference to FIGS. 1-3, the filter cartridge 14 is illustrated as being of a filter-in-filter type with an inner filter 60 and an outer filter 62. In the illustrated embodiment, the inner filter 60 is designed to snap-fit connect with the outer filter 62 during assembly of the cartridge 14 to form an integral unit.

The inner filter 60 includes a ring of filter media 64, an upper end plate 66 secured to an upper end of the media 64, and a lower end plate 68 secured to a bottom end of the media 64. Likewise, the outer filter 62 includes a ring of filter media 70, an upper end plate 72 secured to an upper end of the media 70, and a lower end plate 74 secured to a bottom end of the media 70. The end plates 66, 68, 72, 74 are formed of a suitable material, for example plastic.

Fuel can include water therein in different forms, including free water, e.g. droplets, and emulsified water. Preferably, the filter media 70 is designed so that free water is initially stripped out when fuel enters the filter from the outside. The free water does not penetrate the media 70 and remains substantially outside the filter. The media 70 also coalesces the majority of the emulsified water and separates the now coalesced water from the fuel. The media 70 also retains soft and solid contaminants from the fuel. Water, being heavier than fuel, settles down to the bottom of the filter cartridge 14, and drains through openings to a water collection area at the base of the housing 12. By the time the fuel interfaces with the media 64, most of the water has been separated, and the media 64 filters particles from the fuel before the fuel enters the center of the filter cartridge. The media 64 also strips remaining water from the fuel and prevents the water from entering the media 64. The filtered fuel then enters the standpipe 30 and flows to the outlet 26, leading to a downstream protected component, for example a fuel pump.

The outside of the filter media 64 generally faces the interior of the filter media 70 of the filter 62, with the inside of the ring of media 64 defining a clean or filtered fuel side of the filter cartridge 14 and the outside of the media 70 defining a dirty or unfiltered fuel side, whereby the filter cartridge is configured for outside-in flow. In appropriate circumstances, the concepts described herein can be applied to inside-out type flow filter cartridges.

Figure 4:
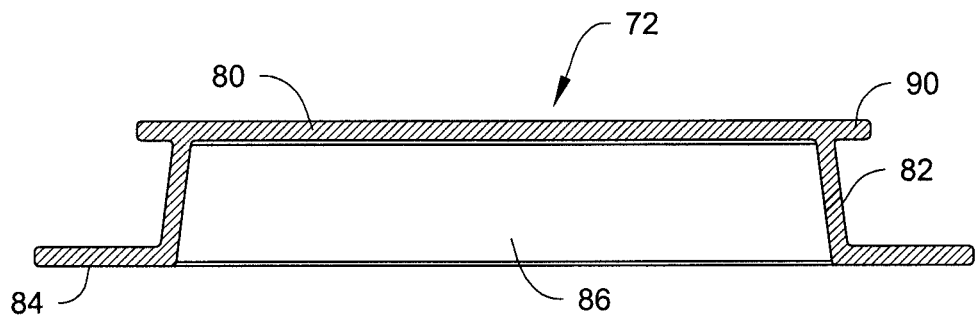
FIG. 4 is a cross-sectional view of the outer filter upper end plate.

The upper endplate 72, as illustrated in FIGS. 3 and 4, includes a first generally circular, horizontal plate 80. A flange 82 extends downwardly from the plate 80 and angles slightly outwardly, with the end of the flange 82 connected to a ring 84 that is generally horizontal. The bottom surface of the ring 84 is suitably attached to the upper end of the filter media 70, for example using an adhesive or using heat to fuse the ring 84 to the filter media.

The plate 80 and the flange 82 define a hollowed-out area 86 that receives the end of the inner filter 60 as shown in FIG. 3. This permits use of a longer inner filter to increase the amount of filter media for filtering.

With reference to FIGS. 1 and 4, the edge of the plate 80 extends past the flange 82 to form a circumferential lip 90. A mechanism is provided for connecting the lid 22 to the filter cartridge 14 via the end plate 72. In particular, a plurality of resilient fingers 92 project downwardly from the lid 22. Each finger 92 includes an enlarged end 94 by which the fingers 92 snap fit over the lip 90. The lid 22 also includes internal threads 96 which engage with external threads 98 formed at the upper end of the side wall 16 by which the lid 22 can be screwed onto the housing body.

In use, the filter cartridge 14 can be connected to the lid 22 prior to inserting the cartridge into the housing, after which the lid 22 is threaded onto the side wall 16. The fingers 92 can slide on the outer edge of the lip 90 to allow the lid 22 to rotate relative to the upper end plate 72. Alternatively, the cartridge 14 can first be installed in the housing, and thereafter the lid 22 connected to the cartridge via the fingers 92 and the lid 22 threaded onto the wall 16. Removal of the lid 22 occurs by unscrewing the lid and lifting the lid and cartridge 14 together from the housing. As the lid 22 is lifted upward, the ends 94 of the fingers 92 engage the lip 90, causing the cartridge 14 to be lifted upwards as well. The cartridge 14 can then be removed from the lid 22 by manually deflecting the ends of the fingers 92 outward to disengage from the lip 90.

If desired, a handle can be attached to the upper surface of the plate 80 to facilitate handling of the cartridge 14, for example lifting of the cartridge from the housing. However, the lip 90 also provides a means to allow a user to grab the caihidge 14 and lift it from the housing. Therefore, the handle is optional.

Figure 5:
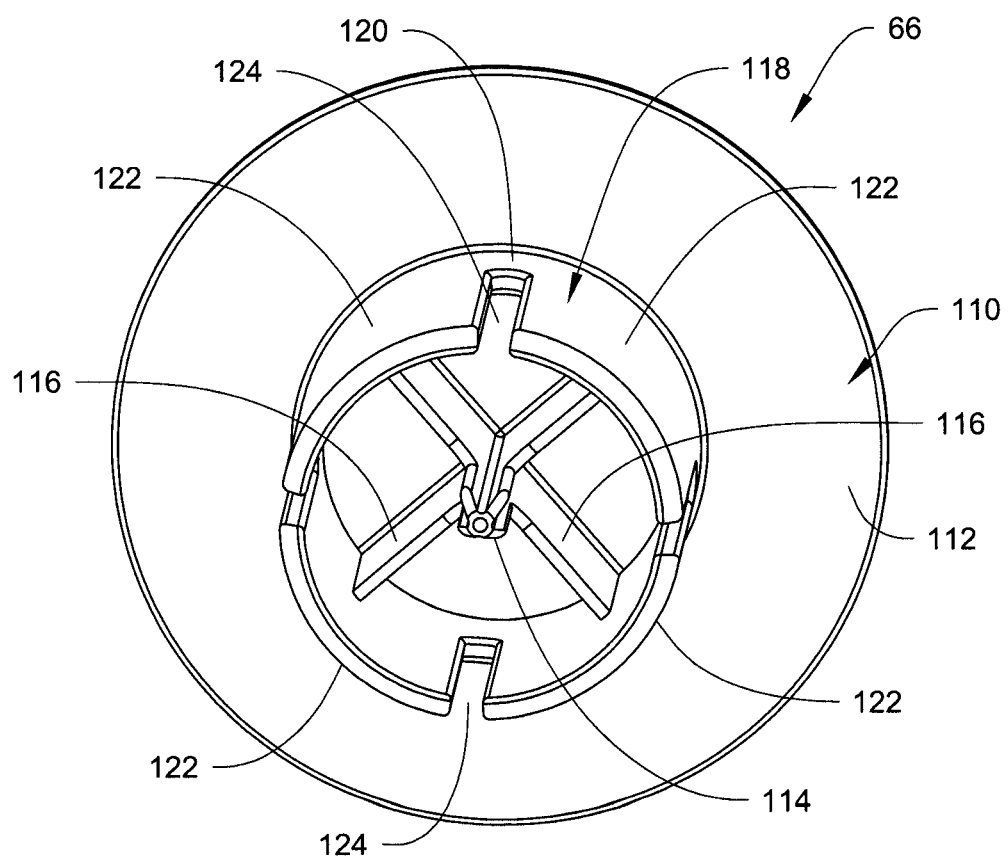
FIG. 5 is a perspective view of the inner filter upper end plate.

Turning to FIGS. 3 and 5, the upper end plate 66 of the inner filter 60 includes a generally circular, horizontal plate 110. The plate 110 includes a perimeter portion 112 that is suitably attached to the upper end of the filter media 64, for example using an adhesive or using heat to fuse the portion 112 to the filter media 64. A pin 114 projects downwardly from the center of the plate 110. The pin 114 is designed to interact with the valve 50 in a manner to be described below. The pin 114 is connected to the plate 110 via four stiffening ribs 116 which provide stiffening to the pin 114.

Extending downward from the plate 110, and surrounding the pin 114 and ribs 116, is a protective skirt 118. The skirt 118 includes a solid circumferential base portion 120 that connects to the plate 110 and to the ends of the ribs 116, and a plurality of spaced tabs 122 extending from the base portion 120. The tabs 122 have a generally constant width from their point of attachment to the base portion 120 to tip ends thereof. A gap 124 is provided between each tab 122, the purpose of which will be described below.

Figure 6A:
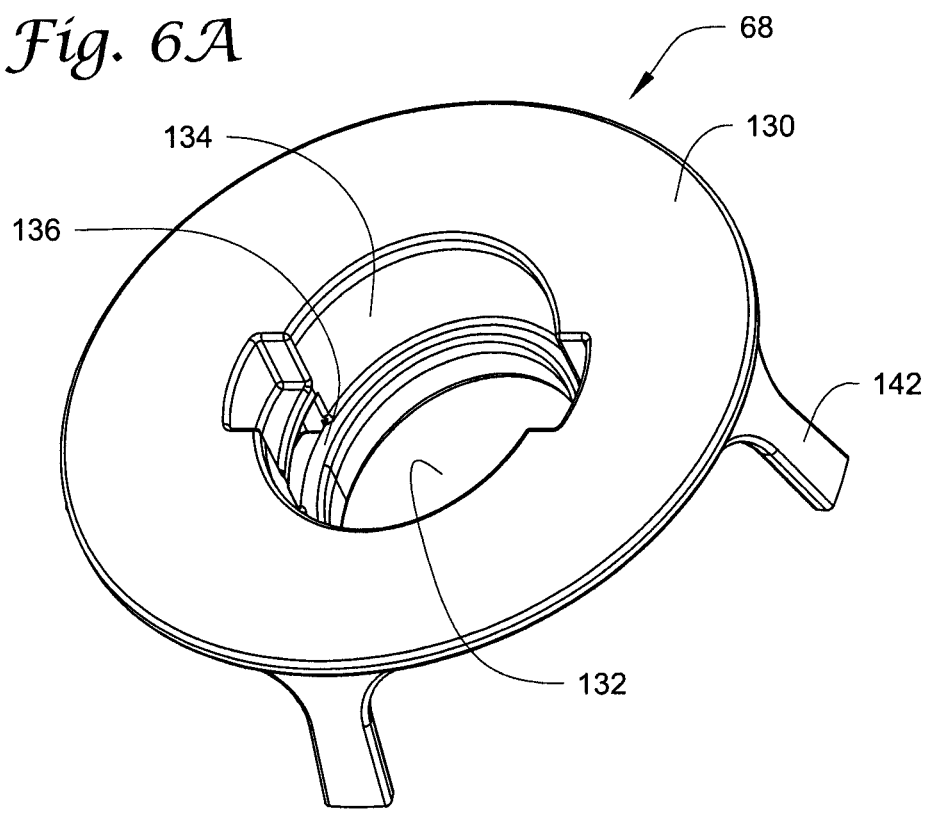
FIGS. 6A and 6B are perspective and side cross-sectional views, respectively, of the inner filter lower end plate.
Figure 6B:
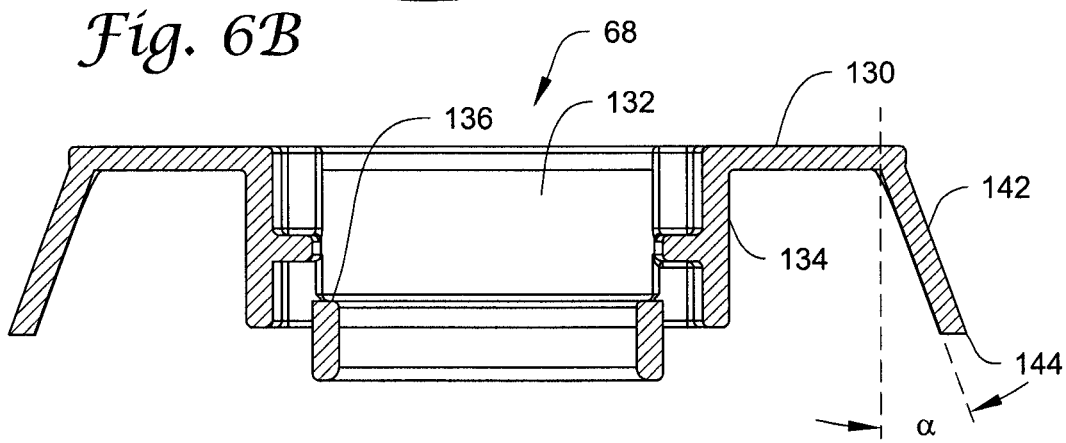

The lower end plate 68 of the inner filter 60 is illustrated in FIGS. 3, 6A and 6B. The end plate 68 includes a generally ring shaped, horizontal plate 130 which is suitably attached to the bottom end of the filter media 64, for example using an adhesive or using heat to fuse the plate 130 to the filter media. A standpipe hole 132 is formed at the center of the plate 130 which is configured to allow passage of the standpipe 30. In the illustrated embodiment, the hole 132 is has a shape similar to the shape of the standpipe 30, for example oval. However, if the standpipe has a different shape, for example circular, then the hole 132 can have a shape, for example circular, similar to the shape of the standpipe.

A seal support 134, for example a flange, extends downwardly from the plate 130 for supporting a seal 138 (visible in FIG. 3) designed to seal with the outside surface of the standpipe 30 when the filter cartridge is installed. The support 134 can extend around the entire perimeter of the hole 132, or only around portions thereof. An inwardly extending ledge 136 is formed at the base of the support 134 for supporting the bottom of the seal 138. The seal 138 extends over the majority of the height of the support 134 and includes an intermediate, inwardly extending ridge 140 that in use seals with the standpipe.

The seal 138 can have any shape suitable for sealing with the outside of the standpipe. For example, in the case of an oval shaped standpipe, the seal can be oval shaped; for a circular standpipe, the seal can be circular. In addition, the seal 138 can be secured to the support 134 in any suitable manner. For example, the seal 138 can be securing to the support 134 by interference fit, adhesives, etc.

A plurality of flexible connection arms 142 are connected to the bottom of the plate 130 near the outer edge thereof, and extend downwardly from the plate 130 at an angle α, for example 20 degrees. The arms 142 can be, in the illustrated example, positioned at equally spaced intervals around the plate, although the spacing could be other than equal. In addition, in the illustrated embodiment there are four arms 142, although a larger or smaller number of arms 142 could be used. The arms 142 each extend at an angle so that ends 144 of the arms are positioned radially beyond the outer edge of the plate 130 (FIG. 6B). The arms 142 also help create a gap between the filter media 64, 70.

Figure 7:
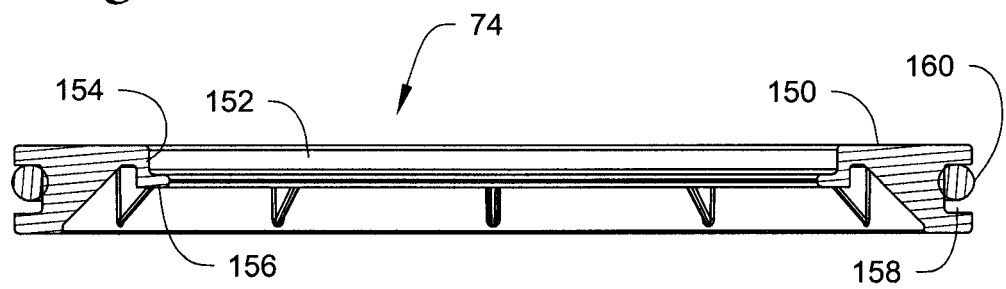
FIG. 7 is a cross-sectional view of the outer filter lower end plate.

The arms 142 are used to help connect the lower end plate 68 of the inner filter 60 to the lower end plate 74 of the outer filter 62. The end plate 74, illustrated in FIGS. 3 and 7, includes a generally ring-shaped, horizontal plate 150 which is suitably attached to the bottom end of the filter media 70, for example using an adhesive or using heat to fuse the plate 150 to the filter media. The plate 150 surrounds a hole 152 through which the inner filter 60 can be inserted into the outer filter 62. The hole 152 is defined by a flange 154 that extends downwardly from the plate 150 around the entire perimeter of the hole 152 to help define the hole.

An inwardly extending ledge 156 is formed at the base of the flange 154. The ledge 156 forms a seat to receive the ends of the arms 142 of the lower end plate 68 of the inner filter 60 thereon as seen in FIG. 3. The outer diameter formed by the ends of the arms 142 is preferably greater than the inner diameter of the inner edge of the ledge 156 so that the arms 142 are compressed inward as the inner filter 60 is inserted into the outer filter 62. Once the ends of the arms 142 clear the ledge 156, the ends 144 spring outward to the position shown in FIG. 3. Thus, the design of the arms 142, the flange 154 and the ledge 156 form a snap fit connection between the filters 60, 62. In addition, relative rotational movement is permitted between the outer filter 62 and the inner filter 60 about the central axis A-A to permit alignment of the opening 132 with the standpipe 30.

Returning to FIG. 7, a slot 158 is formed around the outer perimeter of the flange 154 of the lower end plate 74. The slot 158 receives a seal 160 therein that is designed to seal with an interior surface of the side wall 16 of the housing as shown in FIG. 1.

Flow Restriction Valve

The flow restriction valve 50 will be described with reference to FIGS. 1 and 8-11. The valve 50 is used to control the flow of fuel into the standpipe 30 and to the outlet 26. In one embodiment described herein, the valve 50 is designed to prevent all flow of fuel into the standpipe 30 when no filter cartridge is installed or when an improper filter cartridge is installed, but permit flow into the standpipe when a correctly designed filter cartridge is installed.

In alternative embodiments described herein, the valve can be designed to allow limited flow of fuel into the standpipe 30 when no filter cartridge is installed or when an improper filter cartridge is installed. This limited flow allows lubrication of downstream components, such as a fuel pump, but is insufficient to allow the engine to operate.

The valve 50 will be described as being used with the filter cartridge 14 described above. However, it is to be realized that the concepts of the valve 50 can be utilized with other filter cartridge designs, such as with single stage filter cartridges.

Figure 8:
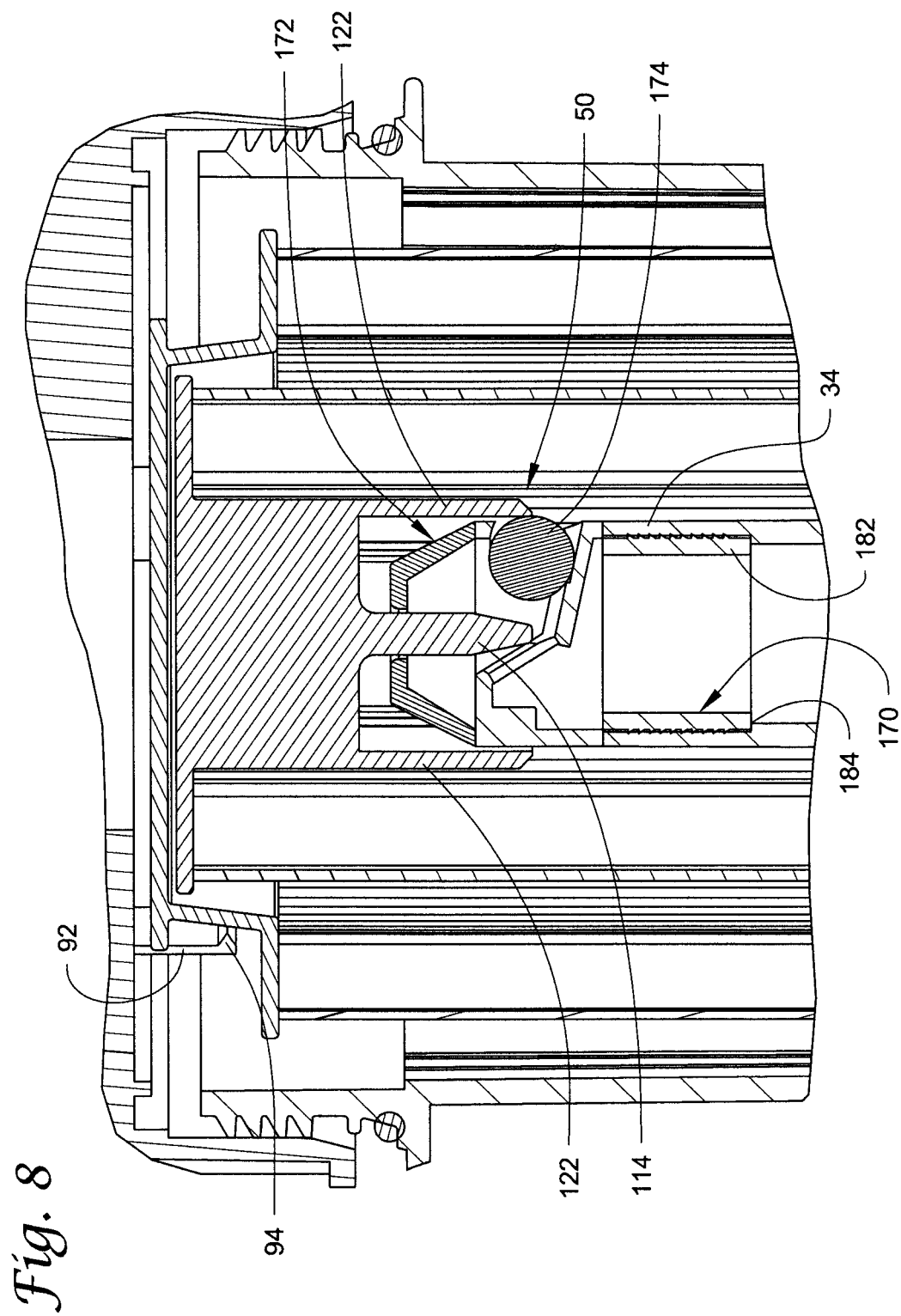
FIG. 8 is a detailed view of the flow restriction valve at the upper end of the standpipe.

The tip end 34 of the standpipe 30 is open, and the valve 50 is secured in the open tip end as shown in FIG. 8. The valve 50 includes a valve cage 170, a valve cap 172, and a ball 174. The valve cage 170 includes a portion that is configured to fit within the end 34 of the standpipe 30. In the case of the oval-shaped standpipe, the portion of the valve cage 170 within the standpipe will be generally oval-shaped to fit closely within the standpipe.

With reference to FIGS. 8, 9A and 9B, the valve cage 170 has a side wall 180, and a reduced diameter section 182 extends from the base of the side wall 180 that is press fit or otherwise secured into the end of the standpipe 30. When inserted into the standpipe, the base of the reduced diameter section 182 rests on a shoulder 184 formed inside the standpipe. To aid in retaining the section 182 in the standpipe, the outer surface of the section 182 is provided with ribs 186 which engage with the interior surface of the standpipe.

The valve cage 170 is generally hollow and is divided by a wall 192 that extends from one side of the side wall 180 toward the opposite side. The wall 192 connects to a wall 194 that extends upwardly to a top wall 196 that connects to the opposite side wall 180. As shown in FIG. 9A, the wall 192 includes an arcuate section 200 that forms a track for the ball 174. The section 200 slopes downward from the will 194 to the side wall 180. The wall 194 includes a circular opening 204 therein that places the exterior of the cage 170 in communication with the interior of the cage 170 and the flow passage 36. The ball 174 is configured to roll along the track 200 and can block the opening 204 to prevent fuel flow into the standpipe.

As shown in FIGS. 9A and 9B, the track 200 includes a step 206 that restricts the ball 174 from inappropriately rolling up the track 200 and blocking the opening 204. The step 206 separates the track 200 into a first track section 200a and a second track section 200b. In addition, the wall 194 is disposed at an acute angle β, for example about 85 degrees, relative to a horizontal axis. Angling of the wall 194 in this manner minimizes the chances of the ball 174 getting stuck in position blocking the opening 204. Further, a rib 208 is disposed inside the cap 170 immediately behind the opening 204. The rib 208 limits how far the ball 174 can penetrate into the opening 204 which aids in preventing the ball 174 from remaining in a position blocking the opening 204.

The cage 170 also includes an opening 222 that is formed through the side wall 180 that place the exterior of the cage 170 in fluid communication with the interior of the cage 170, and thus in communication with the opening 204 and the interior of the standpipe. The opening 222 is positioned on the side wall 180 at a position that is adjacent to the lower end of the track 200 such that when the ball 174 is at the lower end of the track, as shown in FIG. 8, the ball 174 is disposed in the opening 222.

The vertical height of the opening 222 is such that the ball 174 cannot escape out the opening 222. In addition, in the illustrated embodiment, the opening 222 is shaped such that the ball 174 cannot block the entire opening 222 and fuel can flow into the interior of the cage 170 when the ball 174 is in the opening 222. For example, the opening 222 is shown as being generally oblong which, when the ball is at the position shown in FIG. 8, permits fuel to flow between the sides of the ball 174 and the ends of the opening 222 and into the cage 170.

With reference to FIGS. 8 and 10A-C, the valve cap 172 is oval-shaped and designed to be secured to the top of the valve cage 170. The cap 172 can be secured to the cage 170 in any suitable manner, for example with an adhesive or using a thermal bond. When in place, the valve cap 172 fits over the valve cage 170 to confine the ball 174 in the cage.

The side wall 224 of the cap 172 is generally conically shaped and an opening 226 extends through the top of the cap. The opening 226 permits the pin 114 on the filter cartridge 14 (or other pin designs described herein) to extend therethrough when the cartridge is installed, with the pin 114 extending to a position adjacent the track 200 as shown in FIG. 8. In that position, the pin 114 prevents the ball 174 from moving up the track 200 and blocking the opening 204 when the cartridge 14 is installed.

A pair of protrusions 230, 232 are formed on the side wall 224, with the protrusions 230, 232 including angled outer edges 234, 236. If the filter cartridge 14 is not in the proper orientation during installation, the protrusions 230, 232 will cause the filter cartridge 14 to rotate to the correct orientation as a result of engagement between the opening 132/seal 138 on the end plate 68 and the protrusions 230, 232, with the angled edges 234, 236 creating a sideways rotational force to cause the rotation of the filter cartridge. The oval, conically shaped side wall 224 without protrusions could also achieve this auto-alignment. Therefore, the protrusions 230, 232 are optional.

The operation of the valve 50 should be apparent from the description above. When the filter cartridge 14 is not installed, gravity causes the ball 174 to move to the end of the track 200 to the position shown in FIG. 8. When sufficient fuel pressure acts on the ball 174 with no filter cartridge present, the ball 174 is forced up the track 200 to the closed position blocking the hole 204.

Upon installation of the filter cartridge 14, the pin 114 extends downward to the position shown in FIG. 8, blocking the ball from moving up the track 200 to the closed position. In addition, the tabs 122 of the protective skirt 118 extend downward and surround the cage 170 and cap 172. As seen from FIG. 8, the tabs 122 extend downward to a position adjacent the hole 222 and the ball 174. The gaps 124 between the tabs 122 allow fuel to flow between the tabs 122 and into the opening 222, and ultimately into the standpipe.

Since the pin 114 blocks the track 200, the ball 174 cannot move to a position blocking the opening 204. Under operating conditions, the pressure of the fuel will force the ball up the track and into engagement with the pin 114. The opening 222 will be open allowing a maximum amount of fuel to enter the opening 222. The fuel flows past the ball 174 and pin 114, into the opening 204, and into the flow passage 36 of the standpipe to the outlet 26.

In one embodiment, when the ball 174 seats in the opening 204 when no filter cartridge (or an incorrect filter cartridge) is installed, the flow of fuel into the standpipe is substantially completely prevented. In another embodiment, when the ball 174 seats in the opening 204, some fuel can be permitted to flow into the standpipe. The amount of fuel allowed past the ball 174 should be insufficient to permit engine operation, but sufficient to provide lubrication to downstream components, for example the fuel pump, in the case of diesel fuel. Since fuel flow need not be completely prevented, the ball and the opening 204 described herein can be manufactured to less exacting tolerances, which reduces the cost of manufacture. For example, the opening 204 could be formed with a shape that is similar to the shape of the opening 222, whereby when the ball seats in the opening 204 fuel can still flow past the ball. In other designs, the ball and/or the wall defining the opening 204 can be manufactured with grooves, channels or the like to permit fuel flow past the ball.

Therefore, the word prevention as used herein, unless indicated otherwise either in the written description or claims, is meant to include complete shut off of fuel into the standpipe as well as including some flow of fuel into the standpipe, as long as the amount of fuel that passes is insufficient to permit engine operation.

Figure 10A:
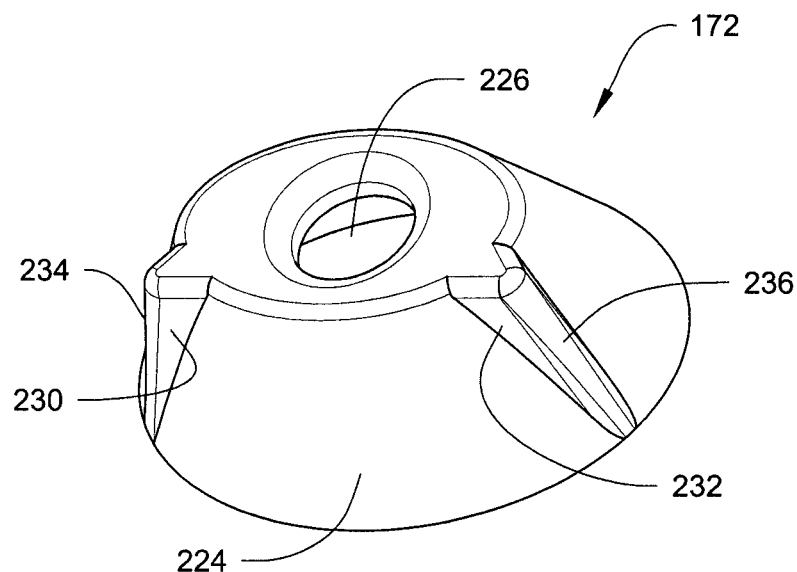
FIGS. 10A, 10B and 10C are a perspective view, a side view and a side cross-sectional view, respectively, of the valve cap of the flow restriction valve.
Figure 10B:
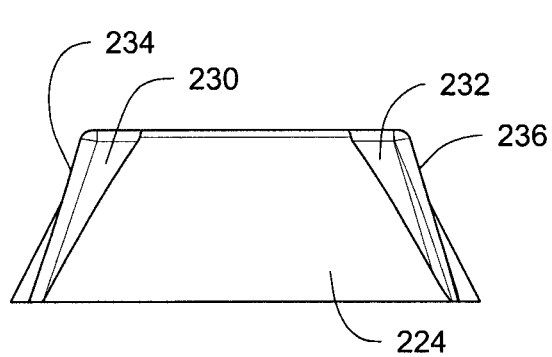
Figure 10C:
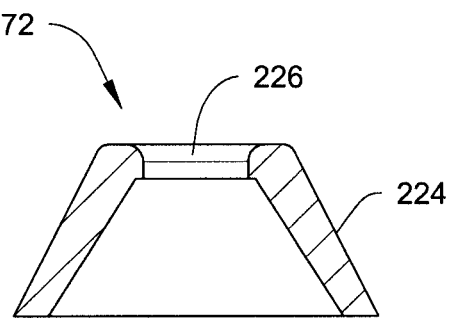
Figure 11:
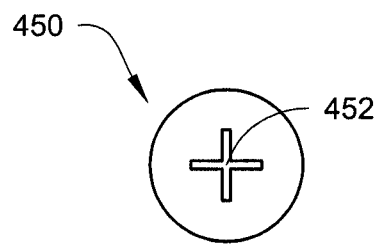
FIG. 11 is a top view of a seal for use in sealing the top opening of the valve cap.

FIG. 11 illustrates a seal 450 that can fit in the opening 226 at the top of the cap 172 (see FIG. 10A). The seal 450 prevents excessive entry of dirty, unfiltered fuel into the standpipe through the opening 226. The seal 450 is provided with a cross split hole 452 that allows passage of the pin 114 through the seal 450 and down toward the ball track to block the ball.

Figure 12:
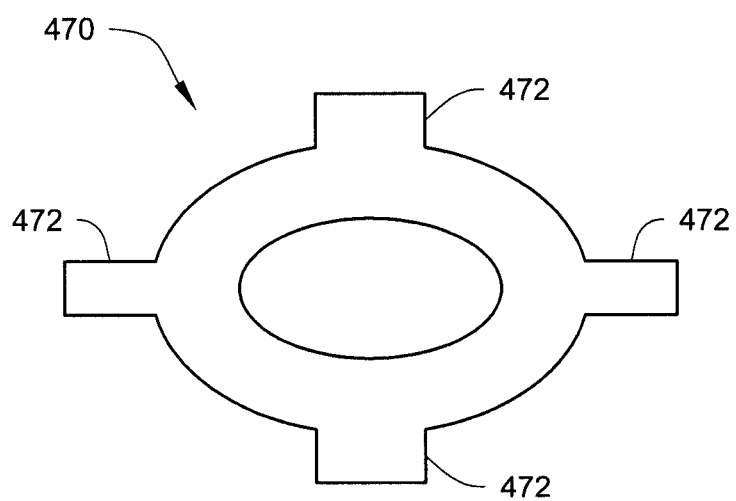
FIG. 12 is an end view of an embodiment of an oval seal for sealing with the standpipe.

FIG. 12 illustrates a seal 470 that is a variation of the seal 138 used on the end plate 68 (see FIG. 3). The seal 470 is designed as a snap-on seal that engages via a snap fit with the flange on the end plate 68. The seal 470 includes a plurality of tabs 472 extending outwardly from the perimeter thereof that engage in grooves formed on the end plate 68 to help retain the seal in place.

Figure 13A:
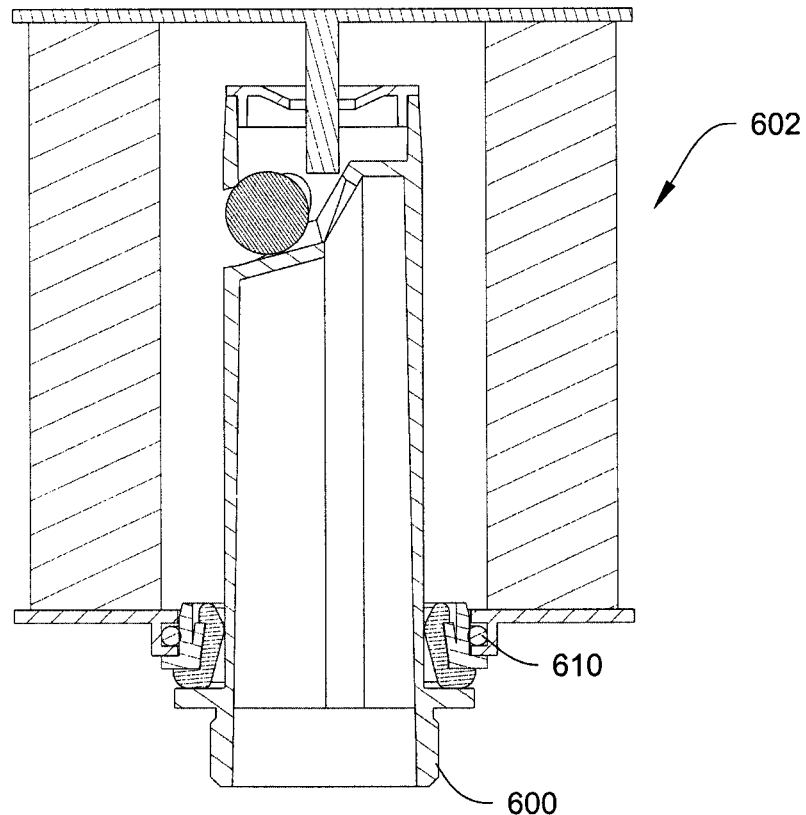
FIGS. 13A and 13B illustrate another embodiment of a seal between a filter cartridge and the standpipe.
Figure 13B:
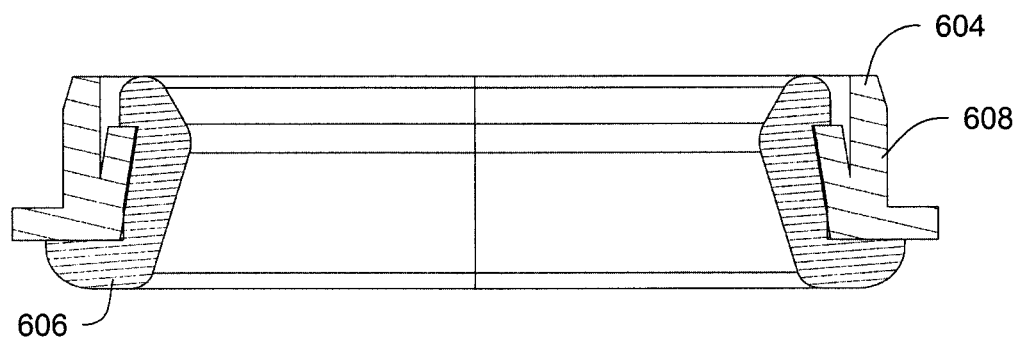

FIGS. 13A and 13B illustrate a variation of a sealing arrangement between a standpipe 600 and a filter cartridge 602. In this embodiment, a sealing plate 604 is provided that can be installed around the standpipe 600. When the standpipe 600 is oval shaped, an oval shaped seal 606 (or a round seal if a round standpipe is used) is fixed to the sealing plate 604 prior to installing the plate 604. When the plate 604 is installed on the standpipe 600, the seal 606 seals with the outside surface of the standpipe 600 to prevent leakage of unfiltered fuel. The outside surface 608 of the plate 604 is circular and is illustrated as being generally vertical and planar. The filter cartridge 602 can include a circular seal 610 that seals with the surface 608 of the plate 604 when the cartridge is installed. This embodiment permits the filter cartridge 602 to have a circular seal design at the bottom thereof. However, the standpipe 600 and filter cartridge 602 can incorporate one or more of the other concepts described above.

Figure 14A:
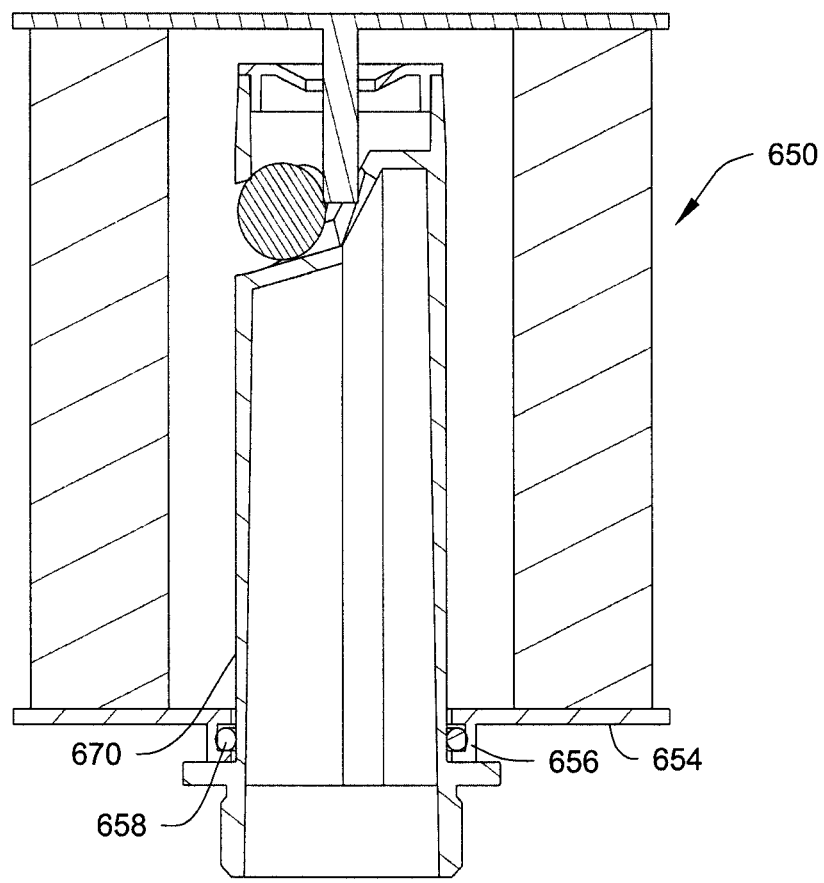
FIGS. 14A and 14B illustrate yet another embodiment of a seal between a filter cartridge and the standpipe.
Figure 14B:
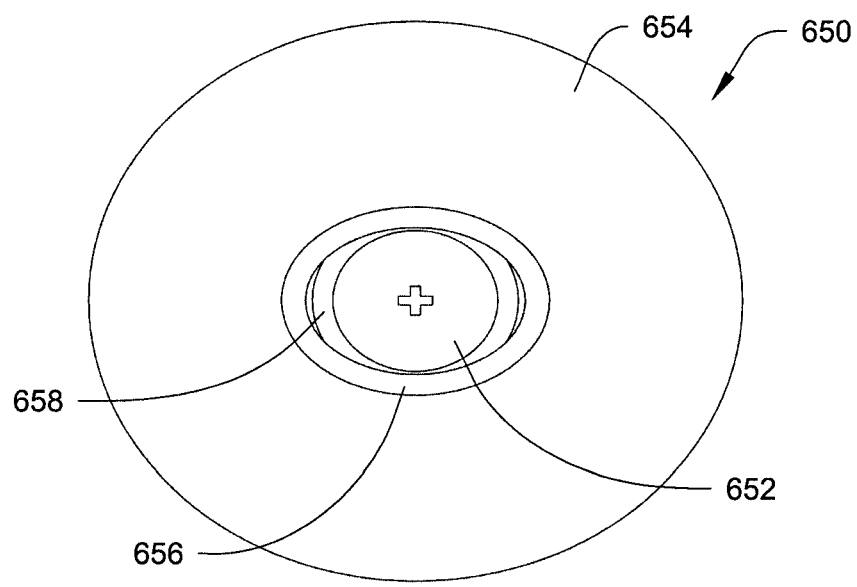

FIGS. 14A and 14B illustrate an embodiment where a filter cartridge 650 includes an oval shaped opening 652 in a bottom end plate 654. An oval shaped gasket groove 656 surrounds the opening 652. A circular seal 658 is disposed in the oval shaped gasket groove 656. As the filter cartridge 650 is installed onto an oval shaped standpipe 670, the seal 658 will conform to the oval shape of the standpipe 670 and groove 656, creating a seal that is oval in shape.

Figure 15:
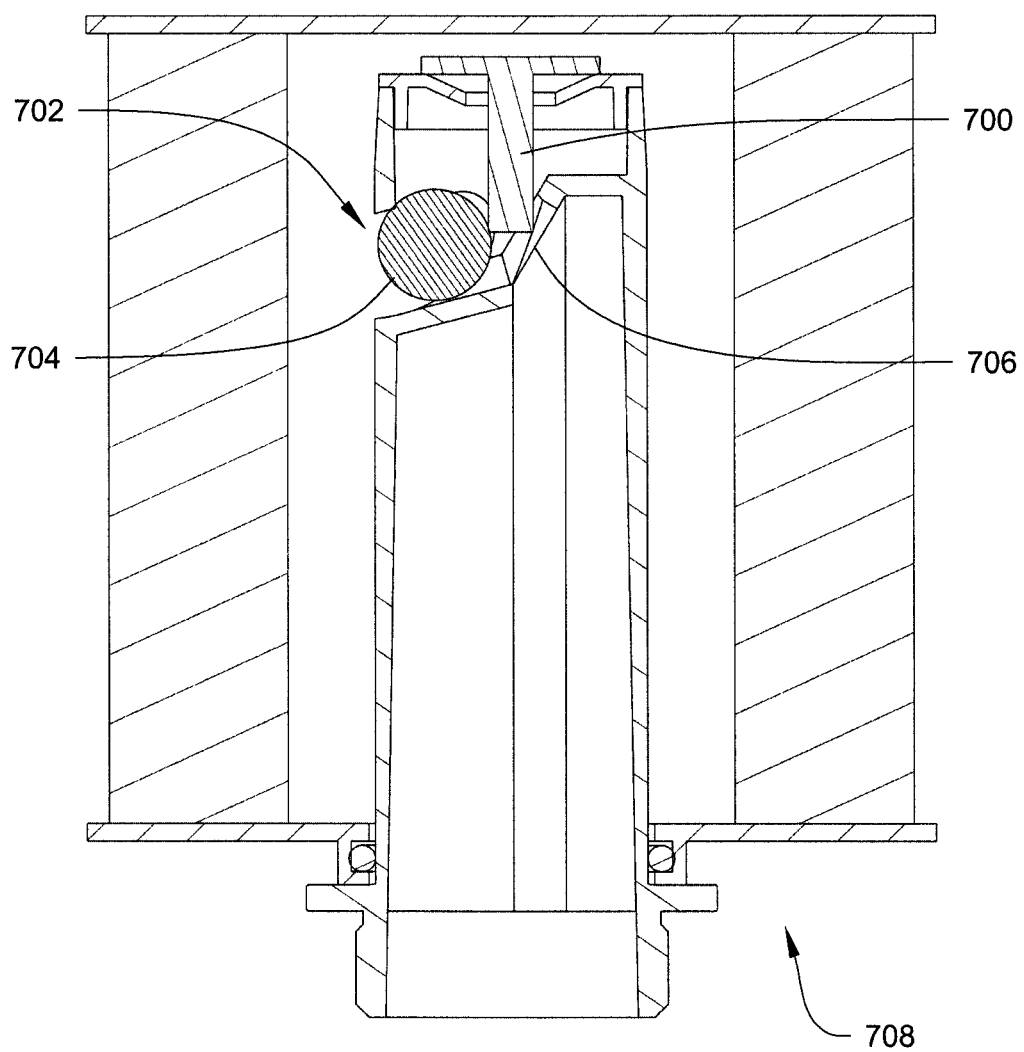
FIG. 15 illustrates an embodiment of a flow restriction valve using a separate pin to block the ball.

The pin 114 has been described above as being connected to the end plate 66. However, alternative designs are possible. FIG. 15 illustrates an embodiment where a separate pin 700 is inserted into an opening in the upper end of a flow control valve 702 to block a ball 704 and prevent the ball from blocking an opening 706. A filter cartridge 708 without a pin connected thereto can then be installed. The filter cartridge 708 is illustrated as being a single stage filter cartridge, although a filter-in-filter design similar to the filter cartridge 14 described above except with the pin 114 and the skirt 118 removed can be used. The pin 706 can be any shape or size, as long as it is able to block the ball 704.

Many of the concepts described above have utilized a standpipe in the filter housing. However, many of the concepts described herein can be implemented on fuel filter housings without standpipes.

Figure 16A:
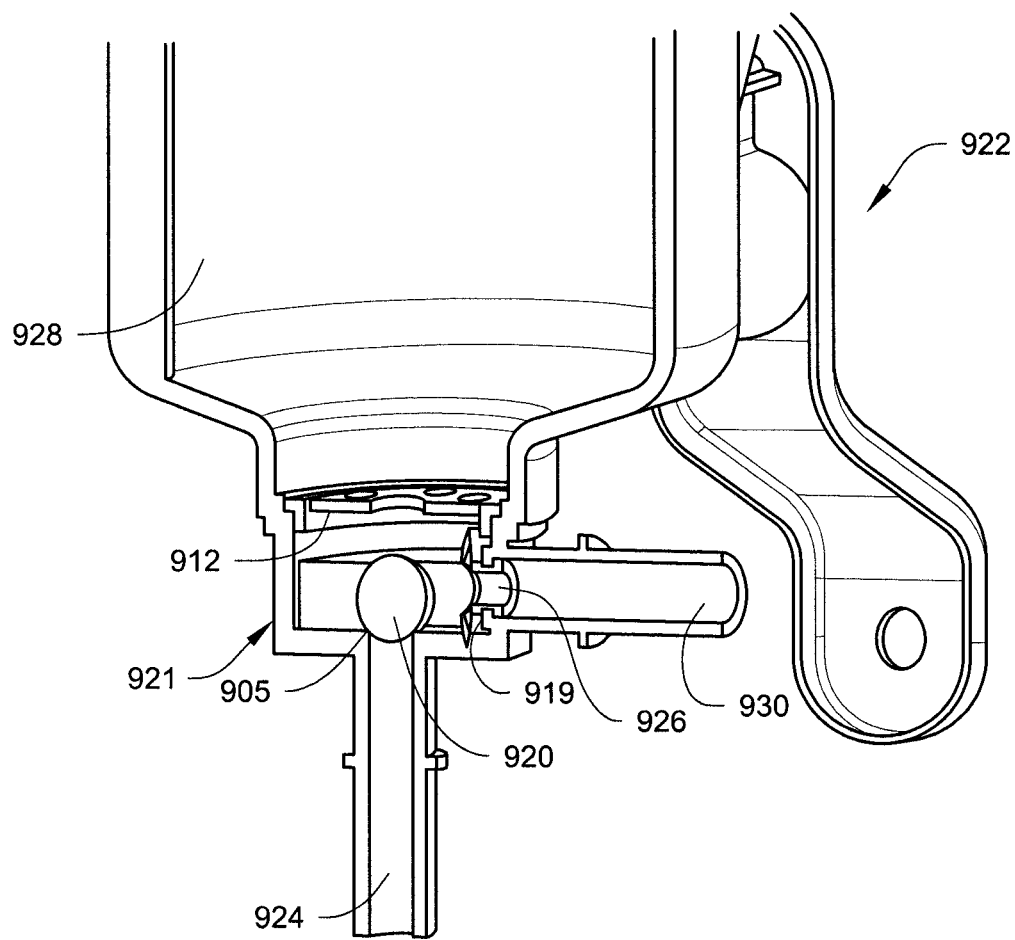
FIG. 16A is a sectional perspective view of a housing body with a valve at the base of the filter housing.

For example, FIGS. 16A-F illustrate a flow restriction valve that includes a ball implemented at the base of a filter housing that is devoid of a standpipe. With reference to FIG. 16A, a ball 920 is placed inside a sink 921 and is seated on an opening 905 of a fuel outlet 924. The outlet 924 is placed at the bottom of the sink 921, which is part of a filter housing 922. The fuel outlet 924 can have an oval-shaped cross-section or it can have a circular shaped cross-section.

Adjacent to the ball 920 inside the sink 921 is a bellow gasket 926. The bellow gasket 926 is attached to a side wall 919 of the sink 921, and is connected to a return channel 930 that leads back to a fuel tank (not shown). In a closed position (FIG. 16A), the ball 920 prevents fluid from entering the outlet 924, such that fuel is forced to enter the bellow gasket 926 and flows back to the fuel tank through the return channel 930.

Figure 16B:
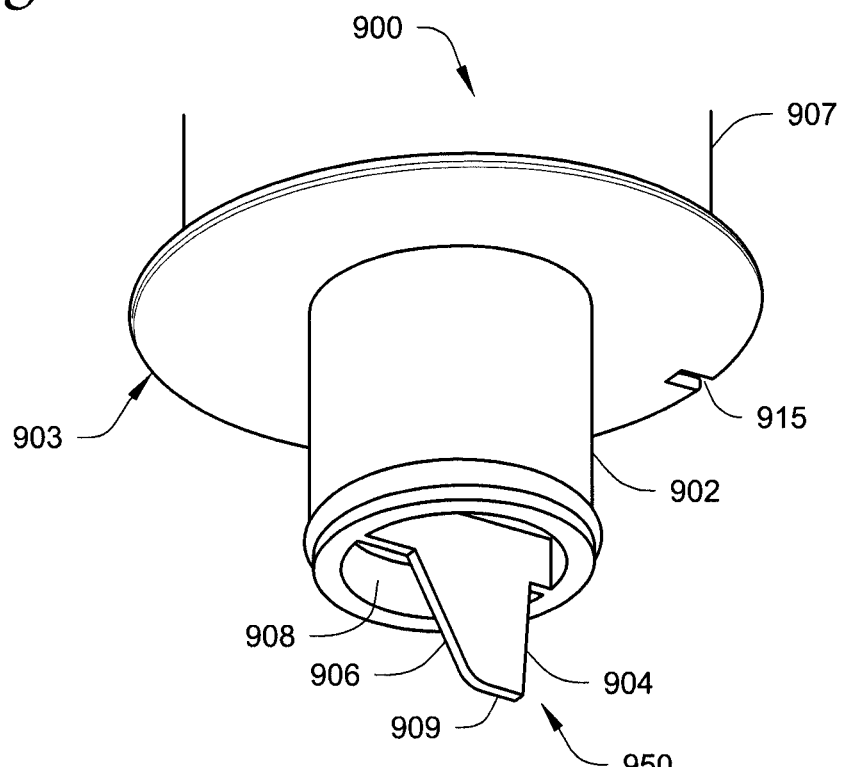
FIG. 16B is a perspective view of a bottom portion of a filter cartridge with a ventral fin useable with the embodiment of FIG. 16A.

Movement of the ball 920 to an open position occurs as a result of installing a correct filter cartridge 900. With reference to FIG. 16B, the cartridge 900 includes a circular endplate 903 and a bottom protrusion 902. The endplate 903 is attached to the bottom region of the filter cartridge 900 and has a diameter that is larger than the filter media 907 of the cartridge 900. The endplate 903 has a clean fuel passageway (not shown) that is generally circular along its length. The endplate 903 is provided with a notch 915, such that the notch keys with a corresponding ridge 916 inside the housing 922. The notch 915 and ridge 916 prevent rotation of the cartridge 900 in the housing, and also ensures that the correct filter cartridge is installed.

Figure 16C:
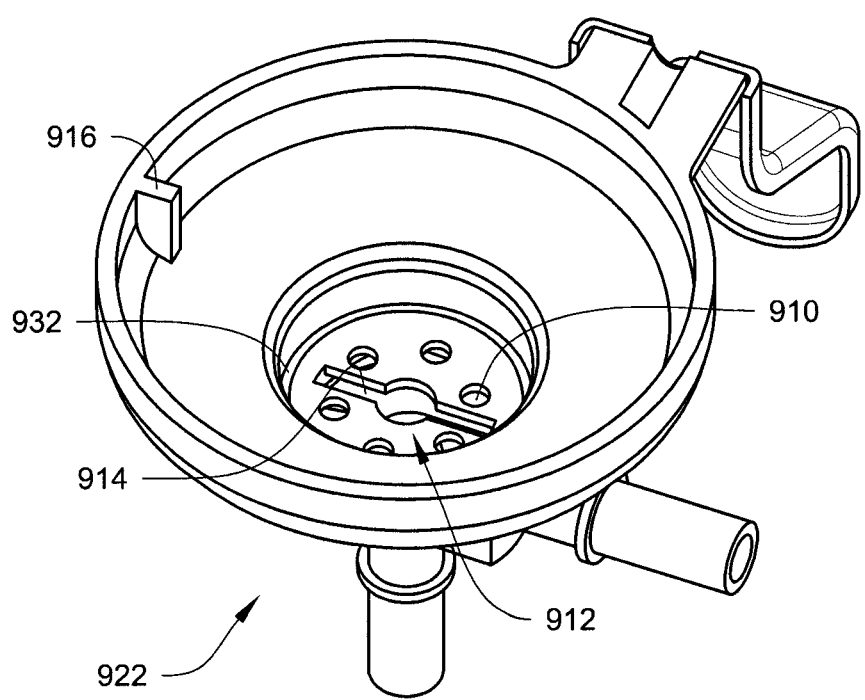
FIG. 16C is a perspective view looking from above of the base of the filter housing of FIG. 16A.

The bottom protrusion 902 is generally cylindrically shaped and is hollow. It has a diameter generally corresponding to that of the clean fuel passageway of the endplate 903. The base opening 908 of the bottom protrusion 902 is provided with a thin ventral fin 950 that runs across the center of the opening 908. The ventral fin 950 is designed to cause movement of the ball 920 to an open position when the cartridge 900 is installed. The ventral fin 950 has a slanted edge 906, which has an acute angle alpha relative to a central, longitudinal axis A-A (FIG. 16F), and a vertical edge 904 generally parallel to the axis A-A. The fin 950 is thin enough to slide through a central slit 914 of a washer 912 (FIG. 16C). The central slit 914 of the washer 912 positions the cartridge 900, and a plurality of holes 910 in the washer 912 allows fuel to pass through.

Figure 16D:
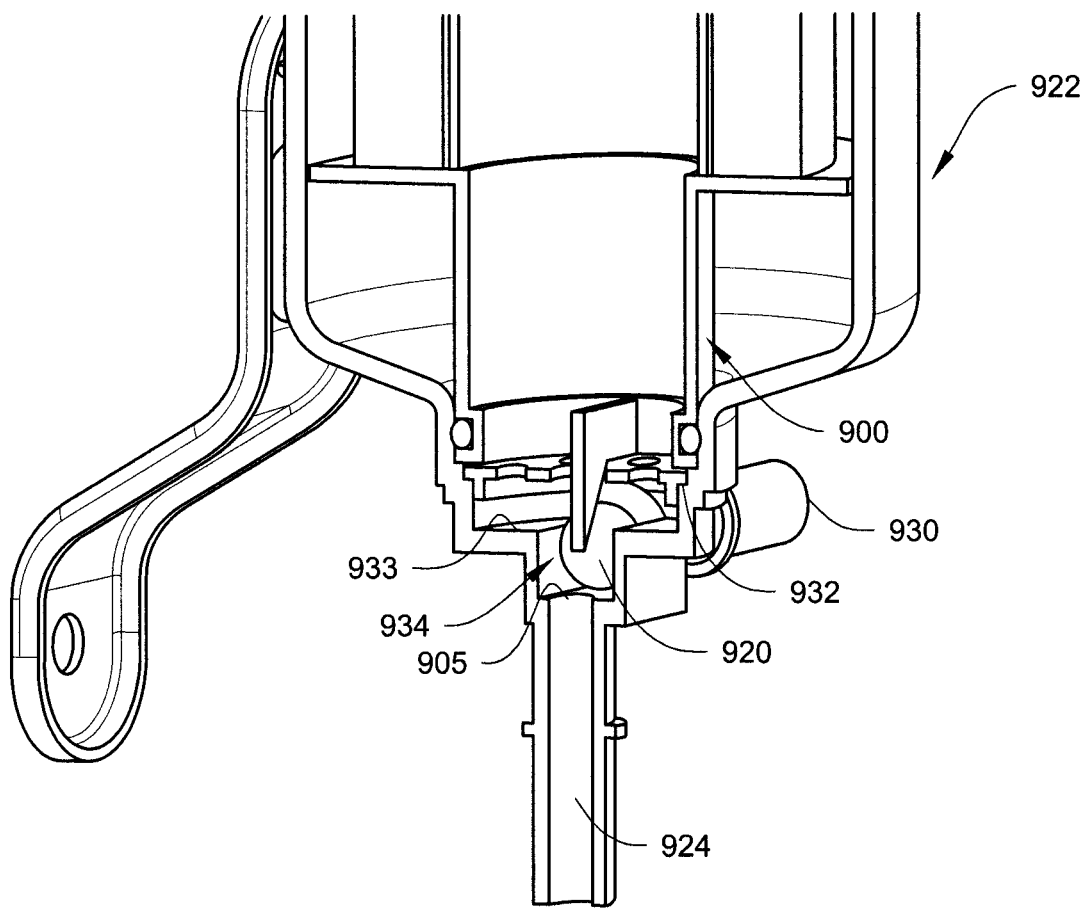
FIG. 16D is a sectional perspective view of the filter cartridge partially installed in the filter housing.
Figure 16E:
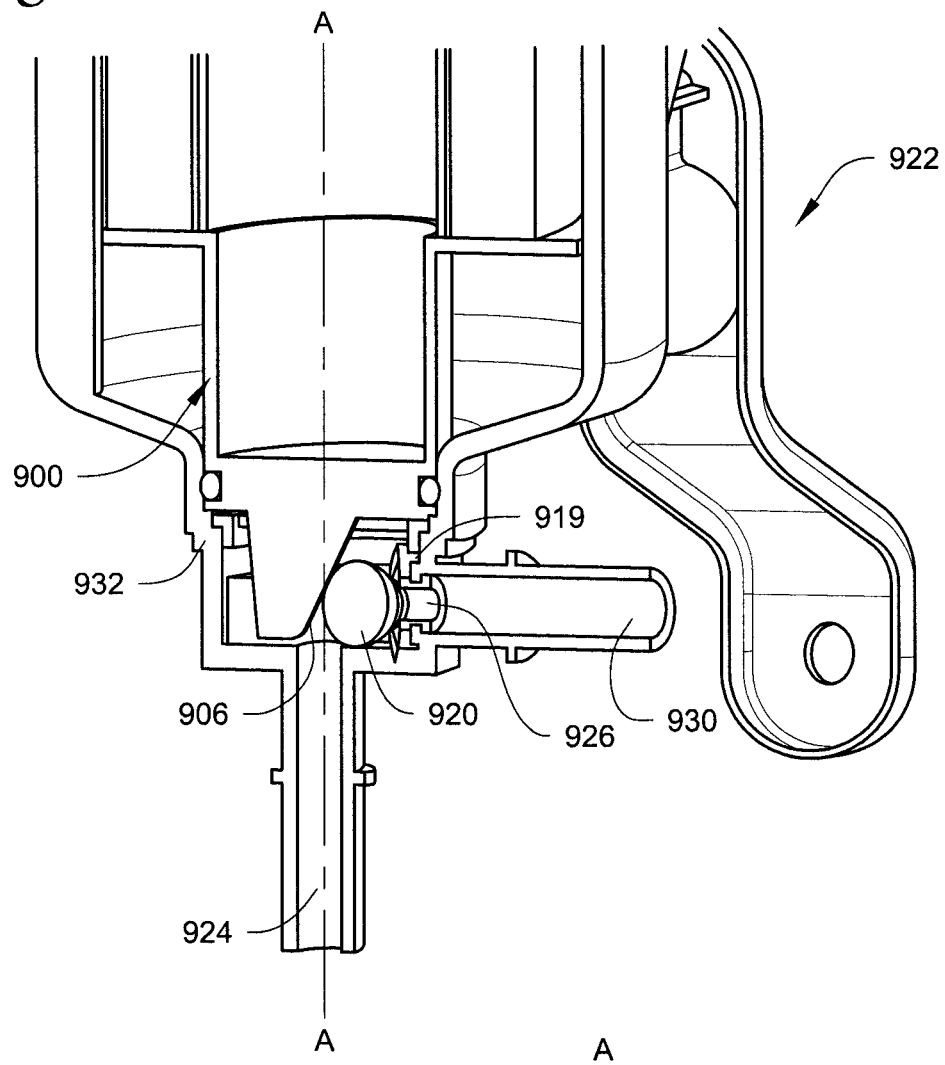
FIG. 16E is a sectional perspective view of the filter cartridge fully installed in the filter housing.
Figure 16F:
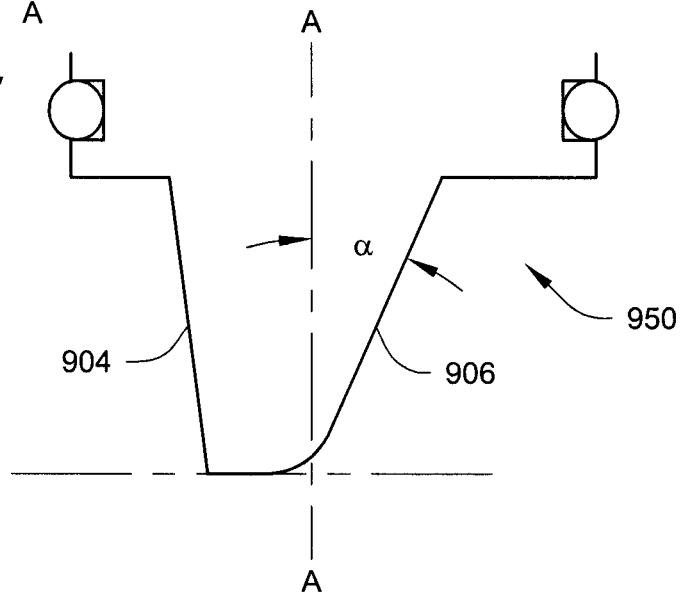
FIG. 16F is a side view of the ventral fin of the filter cartridge of FIG. 16B.

With reference to FIGS. 16A, 16D and 16E, the washer 912 is placed on a rim 932 of the sink 921. The rim 932 and the sink 921 are generally circular. The sink 921 has a depth that is larger than the diameter of the ball 920, and larger than the height of the bellow gasket 926. The opening 905 of the outlet 924 is positioned in the center of the sink 921. The bottom surface 933 of the sink 921 is provided with a bottle shaped channel 934. The bottle shaped channel 934 facilitates movement of the ball 920 toward the bellow gasket 926 when the cartridge 900 is installed.

The cartridge 900 is installed by aligning the notch 915 with the ridge 916 and inserting the ventral fin 950 through the slit 914 of the washer 912. When the ventral fin 950 extends through the slit 914, the slanted region 906 of the ventral fin 950 pushes the ball 920 in a horizontal direction relative to the axis A-A toward the bellow gasket 926. When the flat end 909 on the tip of the ventral fin 950 sits inside the neck of the bottle shaped channel 934, the ball 920 is in an open position, seated in the bellow gasket to prevent fuel from entering the bellow gasket 926 and to allow fluid to flow through the outlet 924.

The ball 920 can be designed to prevent all fuel flow into the outlet 924 when the ball is at the closed position. Alternatively, the ball 920 can be designed to permit limited fuel flow into the outlet 924 when closed. For example, grooves or slots can be formed on the ball 920 and/or on the wall defining the opening 905 that allow limited fuel flow when the ball is at the closed position. How limited fuel flow is permitted past the ball 920 is not critical, so long as the amount of fuel flow permitted at the closed position is insufficient to allow the engine to operate.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fuel filter cartridge comprising:
   a filter media that is suitable for filtering fuel having a first end, a second end opposite the first end, and a clean fuel side;
   a bottom end plate attached to the second end of the filter media;
   a protrusion extending away from the bottom end plate, the protrusion being cylindrically shaped and hollow, the protrusion having a fuel passageway therein that is in fluid communication with the clean fuel side of the filter media to receive filtered fuel, and the protrusion having a base opening that places the fuel passageway in fluid communication with an exterior of the protrusion, the base opening on an end opposite the bottom end plate away from the first end of the filter media; and
   a fin that extends across the base opening and extends downward from the base opening away from the bottom end plate, the fin configured to actuate a valve.

2. The fuel filter cartridge of claim 1, wherein the filter media has a central axis, and the protrusion is coaxial to the central axis.

3. The fuel filter cartridge of claim 1, wherein the bottom end plate is provided with a notch that keys with a corresponding ridge inside a fuel filter housing when the fuel filter cartridge is placed inside the fuel filter housing.

4. The fuel filter cartridge of claim 1, wherein the fuel passageway is circular along a length of the fuel passageway, and the diameter of the protrusion corresponds to the diameter of the fuel passageway.

5. The fuel filter cartridge of claim 1, wherein the bottom end plate has a diameter that is larger than a diameter of the filter media.

6. The fuel filter cartridge of claim 1, further comprising a top end plate attached to the first end of the filter media.

7. The fuel filter cartridge of claim 1, further comprising a filter cartridge housing including:
   the valve that controls fluid flow out of the filter cartridge housing;
   a filter cartridge housing outlet; and
   a return channel;
   wherein the valve comprises an opening keyed to the fin such that the fin engages the opening and actuates the valve-to allow fluid flow through the filter cartridge housing outlet instead of the return channel.

8. The fuel filter cartridge of claim 7, wherein the valve comprises a ball and a ball opening keyed to the ball such that when a fluid pressure forces the ball against the ball opening blocking the filter cartridge housing outlet, fluid flow through the ball opening is restricted.

9. The fuel filter cartridge of claim 8, wherein the fin extends through the opening and prevents the ball from contacting the ball opening.

10. The fuel filter cartridge of claim 8, wherein the valve is configured such that no fluid flows through the filter cartridge housing outlet in the absence of the fuel filter cartridge.

11. The fuel filter cartridge of claim 7, wherein the bottom end plate comprises a notch and wherein the filter cartridge housing comprises a ridge complementary to the notch such that the notch keys with the ridge.

12. The fuel filter cartridge of claim 1, wherein the fin has a slanted edge that has an acute angle relative to a central axis of the filter media, and a vertical edge that is perpendicular to the central axis.

13. The fuel filter cartridge of claim 1, wherein the protrusion is provided with a radial seal adjacent the fin.

* * * * *